US010935461B2

(12) United States Patent
Mylonas

(10) Patent No.: US 10,935,461 B2
(45) Date of Patent: Mar. 2, 2021

(54) METHOD FOR MEASURING AUTOMOBILE HORSEPOWER USING AN ACCELEROMETER

(71) Applicant: Dionysios Mylonas, Athens (GR)

(72) Inventor: Dionysios Mylonas, Athens (GR)

( * ) Notice: Subject to any disclaimer, the term of this patent is extended or adjusted under 35 U.S.C. 154(b) by 299 days.

(21) Appl. No.: 15/949,019

(22) Filed: Apr. 9, 2018

(65) Prior Publication Data

US 2018/0335369 A1     Nov. 22, 2018

(30) Foreign Application Priority Data

May 16, 2017    (GR) ............................... 20170100230

(51) Int. Cl.
    *G01M 15/04*       (2006.01)
    *G01L 3/24*        (2006.01)

(52) U.S. Cl.
    CPC ............. *G01M 15/044* (2013.01); *G01L 3/24* (2013.01)

(58) Field of Classification Search
    CPC ................................ G01L 3/24; G01M 15/044
    See application file for complete search history.

(56) References Cited

U.S. PATENT DOCUMENTS

| 3,693,426 | A | * | 9/1972 | Little | ........................ | G01L 3/24 |
| | | | | | | 73/862.192 |
| 7,643,912 | B2 | * | 1/2010 | Heffington | ............. | G07C 5/085 |
| | | | | | | 701/1 |
| 2004/0215379 | A1 | * | 10/2004 | Pangerl | ..................... | G01L 3/26 |
| | | | | | | 701/31.4 |
| 2011/0112717 | A1 | * | 5/2011 | Resner | ................... | G07C 5/085 |
| | | | | | | 701/31.4 |
| 2013/0060500 | A1 | | 3/2013 | Narumi | | |

FOREIGN PATENT DOCUMENTS

| DE | 102017200604 A1 | * | 7/2018 | ......... F02D 41/1497 |
| EP | 200660 A1 | | 11/1986 | |
| GR | 20080100583 A | | 4/2010 | |
| WO | WO9523957 A1 | | 9/1995 | |

OTHER PUBLICATIONS

Serway, Physics for Scientists and Engineers, Chapter 7: Work and Kinetic Energy, pp. 202-203, 2000 (Year: 2000).*

* cited by examiner

*Primary Examiner* — Jennifer E Simmons

(57) ABSTRACT

The present invention provides a more accurate method for measuring the automobile horsepower, specifically the internal combustion engine, ICE horsepower at the crankshaft, or the electric motor(s') horsepower, or the combined ICE and electric motor(s') horsepower. It applies to automobiles that do not incorporate, or can disengage, regenerative braking, RGB.

In contrast to the in-house, chassis dynamometers that measure the performance of the automobile under conditions that simulate to a certain extent road conditions, the proposed invention measures horsepower in real road test conditions, through the utilization of an accelerometer that performs measurements of the automobile velocity, acceleration and deceleration.

11 Claims, 1 Drawing Sheet

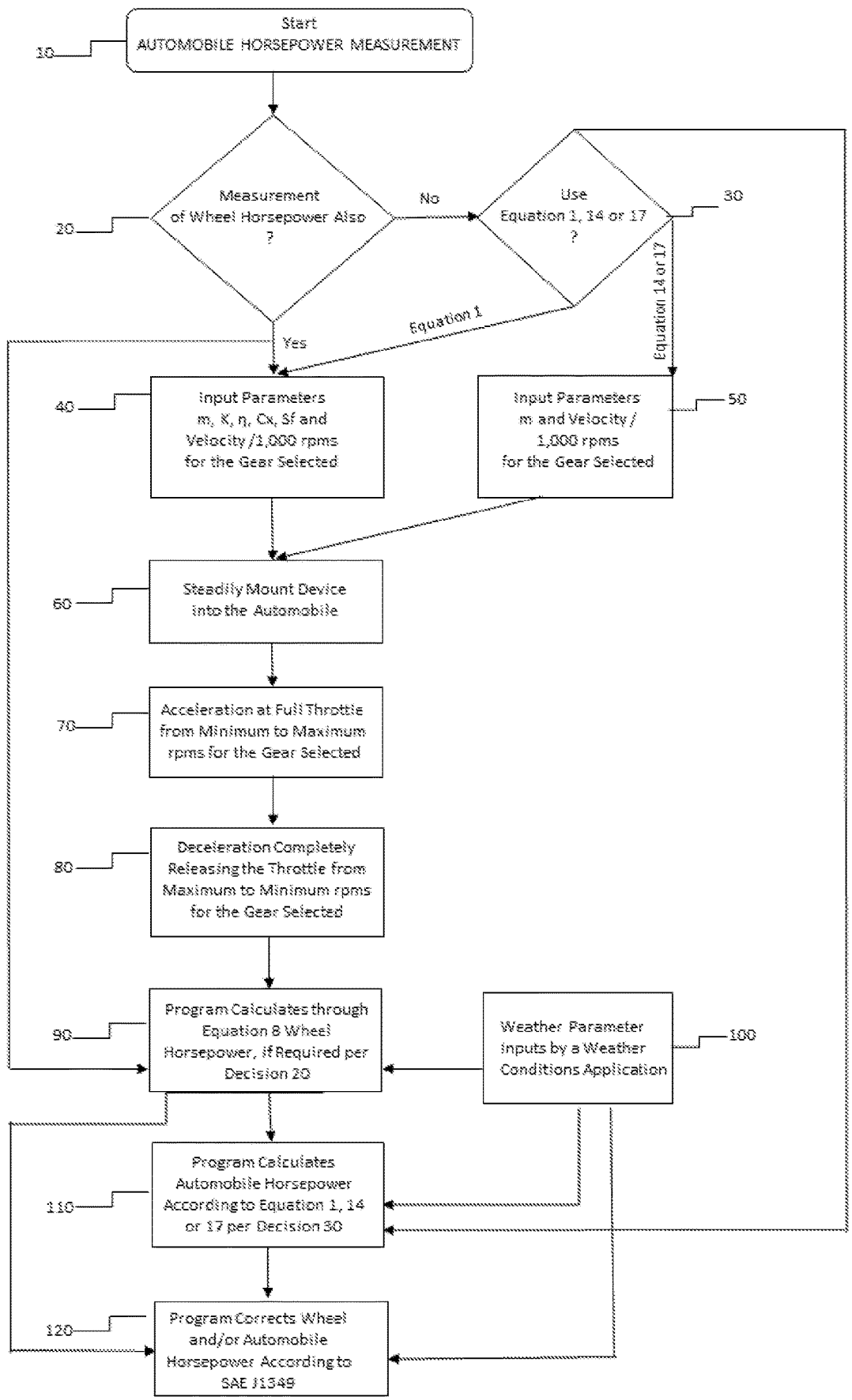

METHOD FOR MEASURING AUTOMOBILE HORSEPOWER USING AN ACCELEROMETER

CROSS REFERENCE TO RELATED APPLICATIONS

The present application claims priority from Greek patent application 20170100230 filed on May 16, 2017 with the Greek Patent Office which is incorporated herein by reference in its entirety.

BACKGROUND

The present invention provides a method for measuring the horsepower of internal combustion engines and electric motors powering automobiles using an accelerometer.

Internal combustion engine, ICE horsepower, i.e. horsepower at the crankshaft, is commonly measured by in-house chassis dynamometers that usually incorporate rollers, i.e. large cylinders that are rotated by the torque applied through the automobile's wheels during the acceleration phase, in which a certain gear is engaged and full throttle is applied for the total range of speeds («rev range») of the engine. The acceleration phase is immediately followed by the deceleration («coast-down») phase, whereby neutral is engaged, therefore the powertrain and accordingly the drivetrain is essentially disengaged and the engine is left to decelerate back to the lowest possible engine speed. The torque measured, using these methods, is evidently the one delivered by the wheels, not by the crankshaft of the automobile's engine.

The chassis dynamometers calculate then the wheel horsepower by applying a common formula that relates horsepower to torque and, subsequently, the horsepower at the crankshaft by applying proprietary algorithms that calculate, but do not measure as the drivetrain is essentially disengaged, drivetrain losses based on the power losses measured during the deceleration phase and add them to the calculated, per above, wheel horsepower.

This measurement method has a number of disadvantages, such as heavy fatigue of the engine, since the rotating cylinders exert a larger resistance to rotation than the resistance encountered by the wheels in real road conditions. This has as a consequence the revving of the engine at high speeds (revolutions per minute, rpms) for a longer time period than it would be required in road conditions, leading to the abovementioned engine fatigue.

Also, during chassis dynamometer measurements, the engine does not deliver its torque/power as it would on the road, something that creates uncertainty regarding the accuracy of the measurement especially taking into account the possible intervention of the automobile's Engine Control Unit, ECU in order to protect the engine by lowering its power output switching to "safe mode", something that actually happens quite often.

Also, during chassis dynamometer measurements the engine is not ventilated as it would be if on the road. This has a dual drawback: first, further fatigue of the engine (and associated equipment) operating at higher temperatures than normally, and second and most importantly, the feeding of the intake system with less air and accordingly less fuel than on the road, directly resulting into an underestimation of the engine's torque and accordingly horsepower. The latter drawback is particularly important for several modern high-performance engines which have a forced intake system that compresses air, something similar to a certain extent to the widely applied in current motorcycles «RAM-air» intake system.

Other methods have been suggested, which do not use an in-house, chassis dynamometer to measure the engine horsepower. Such methods measure the automobile's velocity and acceleration in real road conditions and calculate torque from horsepower, however, such methods lack in accuracy. This is because they first measure wheel horsepower through acceleration of the automobile, again engaging a certain gear and applying full throttle for the whole rev range of the engine. They do not incorporate a deceleration phase. Then, in order to calculate horsepower at the crankshaft, they either apply proprietary algorithms embedding certain assumptions, or, more simply, assume a certain drivetrain loss percentage depending on the automobile's transmission system (e.g., manual or automatic gearbox, 2-wheel or 4-wheel drive, etc). Thus, they do not actually measure engine horsepower but, instead, they estimate it based on measured wheel horsepower.

The present invention provides a method and a device applied in real road conditions that are more accurate than existing methods.

SUMMARY OF THE INVENTION

An aspect of the present invention relates to a method for measuring automobile horsepower, in real road conditions. The method may include using a mobile device employing an accelerometer, such as a smartphone, steadily positioned into the automobile. The method is characterized in that it incorporates two phases, i.e. an acceleration phase and a deceleration phase and takes measurements during both. In addition, both phases are executed with the same gear of the automobile's gearbox engaged. In an embodiment, the method calculates the automobile horsepower, $P_e$ by the following equation:

$$P_e = m\ v[dv/dt(acc) + (1-K)dv/dt(dec)] + K[\eta mg\ v + \tfrac{1}{2} d\ C_x S_f v^3] \quad (1)$$

wherein m is the total mass of the automobile including passengers and cargo, v is the automobile velocity, dv/dt (acc) is the automobile acceleration during the acceleration phase, dv/dt(dec) is the automobile deceleration during the deceleration phase, t is time, K is a dimensionless empirical factor between 0 and 1 representing pumping losses as a fraction of powertrain losses, $\eta$ is the rolling friction coefficient, g is the gravitational constant, d is the density of air at the ambient conditions where the measurement takes place, $C_x$ is the aerodynamic resistance coefficient of the automobile and $S_f$ is the frontal area of the automobile.

For values of K approaching zero, i.e. when pumping losses are negligible or non-existent, equation (1) reduces to the following simplified equation:

$$P_e = m\ v[dv/dt(acc) + dv/dt(dec)] \quad (14)$$

For automobiles powered by normally aspirated four-stroke gasoline engines encountering pumping losses, which consist a large percentage of the total number of automobiles in use worldwide, equation (14) is transformed to the following equation:

$$P_e = 0.85m\ v[dv/dt(acc) + dv/dt(dec)] \quad (17)$$

In an embodiment, the method includes using a smartphone incorporating an accelerometer and a suitable mobile application using the aforementioned equations for measuring the automobile horsepower, with the smartphone being steadily mounted into the automobile to be measured. Prior to the measurement, the user may enter into the mobile application the values of the parameters m, K, η, d, $C_x$, $S_f$, and the velocity achieved by the automobile per 1,000 rpms at the gear to be selected, as may be needed. The accelerometer performs the measurements of v and dv/dt (acc) first under full throttle acceleration of the automobile and then v and dv/dt(dec) under deceleration of the automobile having fully released the throttle. Finally, the mobile application calculates based on equation (1) or equation (14) or equation (17), depending on the case, engine horsepower as a function of time and engine speed.

The method of the present invention improves significantly the accuracy of the automobile horsepower measurement. The method of the present invention measures the horsepower in real road conditions and unlike heretofore methods and devices, it incorporates data from a deceleration phase of the automobile allowing the actual calculation of drivetrain losses for specific cases, as will be shown in the next section. Unlike the present invention, currently applied methods do not incorporate a deceleration phase and cannot calculate such drivetrain losses. Some prior art methods may estimate such drive train losses based on various assumptions but are generally not accurate.

The present invention method allows an automobile owner to measure the horsepower of the automobile without the need to take the car to a mechanic's shop. Moreover, it is more economical than visiting an in-house chassis dynamometer, and it is easily repeatable, a characteristic that provides to the user a more thorough view of the automobile's horsepower by performing multiple measurements at will.

Another aspect of the invention is that it is also suitable for measuring the horsepower of electric vehicles, EVs that incorporate an operating mode during which regenerative braking, RGB is disengaged.

BRIEF DESCRIPTION OF THE DRAWINGS

These and other features and advantages of the present invention will become apparent to those skilled in the art to which the present invention pertains from the following detailed description of specific embodiments of the invention in reference with the following FIGURE:

FIG. 1 is a flowchart of a method for measuring the automobile and/or wheel horsepower, according to an embodiment of the present invention.

DETAILED DESCRIPTION OF THE INVENTION

Various embodiments of the present invention are described below in more detail. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the various aspects and features of the present invention to those skilled in the art to which this invention pertains.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

It will be further understood that the terms "comprises," "comprising," "includes," and "including" when used in this specification, specify the presence of the stated elements and do not preclude the presence or addition of one or more other elements.

It is also noted, that in some instances, as would be apparent to those skilled in the relevant art, a feature or element described in connection with one embodiment may be used singly or in combination with other features or elements of another embodiment, unless otherwise specifically indicate.

The present invention provides a more accurate method for measuring the ICE and electric motor(s) horsepower of automobiles.

In contrast to the in-house chassis dynamometers that measure the performance of the automobile under conditions that simulate to a certain extent road conditions, the proposed invention measures horsepower in real road test conditions, through the utilization of an accelerometer that performs measurements of the automobile velocity, acceleration and deceleration. Unlike other similar applications that use an accelerometer in real road test conditions, it also incorporates the phase of deceleration immediately after the phase of acceleration, achieving as will be shown below correctness from a scientific point of view, and significantly higher accuracy from a practical point of view.

The present invention provides an improved, more accurate method for measuring the horsepower of automobiles. The method is particularly suitable for measuring the horsepower of an internal combustion engine (ICE) at the crankshaft, or the (combined) electric motor(s') horsepower, or the combined ICE and electric motor(s') horsepower.

In contrast to the in-house, chassis dynamometers that measure the performance of the automobile under conditions that simulate to a certain extent road conditions, the present invention method measures horsepower in real road test conditions, through the utilization of an accelerometer that performs measurements of the automobile velocity, acceleration and deceleration as a function of time in real road conditions and a mobile application calculating the automobile horsepower based on the accelerometer measurements and one or more equations.

Unlike other methods that use an accelerometer in real road test conditions, the present invention method includes a deceleration phase and a respective measurement, immediately after an acceleration phase and the respective measurement, both performed with the same gear in the automobile's gearbox.

This allows a more accurate calculation of the powertrain losses and the calculation of the automobile horsepower, $P_e$ using the following equation:

$$P_e = m\, v[dv/dt(acc) + (1-K)dv/dt(dec)] + K[\eta mg\, v + \tfrac{1}{2}d\, C_x S_f v^3],$$

wherein: m is the total mass of the automobile including passengers and cargo, v is the automobile velocity, dv/dt (acc) is the automobile acceleration during the acceleration phase, dv/dt(dec) is the automobile deceleration during the deceleration phase, t is time, K is a dimensionless empirical factor between 0 and 1 representing pumping losses as a fraction of powertrain losses, η is the rolling friction coefficient, g is the gravitational constant, d is the density of air at the ambient conditions where the measurement takes place, $C_x$ is the aerodynamic resistance coefficient of the automobile and $S_f$ is the frontal area of the automobile.

For various classes of modern automobiles for which pumping losses are negligible or non-existent, the previous equation can be simplified to the following equation, $$P_e = m\, v[dv/dt(acc) + dv/dt(dec)],$$

which is appropriate, among other cases, for measuring the horsepower of certain all-electric cars.

For automobiles powered by normally aspirated four-stroke gasoline engines encountering pumping losses, which consist a large percentage of the total number of automobiles in use worldwide, the prior equation is transformed to the following equation:

$$P_e = 0.85 m\, v[dv/dt(acc) + dv/dt(dec)].$$

In an embodiment, the proposed method employs the use of a suitable software program incorporating the disclosed equations run on a mobile device possessing or operatively coupled to an accelerometer. In an embodiment, the software can be loaded as an application in a smartphone mobile phone device.

The principle of operation of the present invention will now be explained in more detail assuming an automobile travelling, specifically rolling without slipping, on a flat and horizontal road under no wind conditions. In order to apply the method, a gear is engaged and full throttle acceleration is applied from the lowest to the highest allowable engine's rpms.

The individual forces applied on the automobile, excluding its weight and the road surface resistance which are mutually cancelled out, are the following:

$F_w$ is the force applied by the combined ICE and/or electric motor(s) and applied after drivetrain losses to the wheels, $F_f$ is the rolling friction force and $F_a$ is the aerodynamic "drag" force. The resultant force, $\Sigma F(acc)$ that accelerates the automobile is, in absolute values' terms, given by the below equation:

$$\Sigma F(acc) = F_w - F_f - F_a, \text{ equiv. to } F_w = \Sigma F(acc) + F_f + F_a \qquad (2)$$

Based on Newtonian physics, the resultant force $\Sigma F(acc)$ is related to the produced acceleration a as follows:

$$\Sigma F(acc) = ma = m[dv/dt(acc)] \qquad (3)$$

wherein m is the vehicle mass including passengers and cargo, v the velocity and t the time. For practical applicability purposes of the present method, we assume that m is equal to the «apparent mass» of the automobile, i.e., the mass including the «equivalent mass» of the rotating parts.

In addition, the following equations give the values of the other two forces, $F_f$ and $F_a$:

$$F_f = \eta m g \qquad (4)$$

wherein $\eta$ is the coefficient of rolling friction, assumed as constant (i.e. independent of the velocity v) and g the gravitational constant, and $$F_a = \tfrac{1}{2} d\, C_x S_f v^2 \qquad (5)$$

wherein d is the air density at the existing ambient conditions during measurement, $C_x$ is the drag coefficient, assumed as constant, and $S_f$ is the frontal area of the automobile.

Substituting in (2) for the values given by (3), (4) and (5) we get:

$$F_w = m[dv/dt(acc)] + \eta m g + \tfrac{1}{2} d\, C_x S_f v^2 \qquad (6)$$

The power $P_w$ developed by the combined engine and/or electric motor(s) and applied after drivetrain losses to the wheels, is by definition given by:

$$P_w = F_w v \qquad (7)$$

Substituting in (7) for the $F_w$ equivalent given by (6), we get the equation for the combined engine and/or electric motor(s) power to the wheels:

$$P_w = m\, v[dv/dt(acc)] + \eta m g\, v + \tfrac{1}{2} d\, C_x S_f v^3 \qquad (8)$$

Equation (8) gives the wheel horsepower of the automobile as a function of velocity v and acceleration dv/dt(acc), both being able to be calculated by an accelerometer. Parameters m, $\eta$, $C_x$ and $S_f$ are constants in general given by the automobile manufacturer and the tires' manufacturer. Especially as regards d, it is given by easily accessible tables of physical properties of ambient air. Therefore, the device can be prepared for the measurement by entering predetermined values for the abovementioned parameters into the device. The method may calculate using equation (8) the automobile's wheel horsepower.

According to the method of the present invention, during the second phase of the measurement that immediately follows the acceleration phase, i.e., during deceleration with the throttle/gas pedal fully released, the automobile is left to slow down with the gear selected during the acceleration phase.

Another important feature, besides incorporating the deceleration phase in contrast to other applications in real road conditions, of the present invention is that the automobile is decelerated in real road conditions with the same gear used during acceleration. By contrast, according to current state of the art in in-house chassis dynamometers, deceleration is performed with the neutral gear in the gearbox, a procedure which is broadly referred to as «coast-down».

The individual forces now applied on the automobile are all forces resistant to its movement, specifically a) the forces exerted by the powertrain (we exclude the traction battery from the definition of «powertrain» for the purposes of this invention, as explained below), i.e., in the general case: internal engine frictional forces mainly expressed as pumping losses that are the greatest source of resistance in engine operation during the deceleration phase (broadly referred to as «engine braking»), drivetrain forces and RGB forces, all three resulting in a total powertrain resistant force denoted as $F_l$, b) the rolling friction force, $F_f$, and c) the aerodynamic «drag» force, $F_a$. These forces are related in terms of absolute values by the following Newtonian equation:

$$\Sigma F(dec) = F_l + F_f + F_a = m[dv/dt(dec)] \qquad (9)$$

wherein dv/dt(dec) is the deceleration caused by the resultant force $\Sigma F(dec)$ of the above detailed forces, during the deceleration phase.

Substituting as above for the individual forces and solving for $F_l$, we get the following equation:

$$F_l = m[dv/dt(dec)] - \eta m g - \tfrac{1}{2} d\, C_x S_f v^2 \qquad (10)$$

Finally, the power losses, $P_l$ that are consumed by the powertrain, by definition equal to the product of $F_l$ and v, are given by the following equation:

$$P_l = m\, v[dv/dt(dec)] - \eta m g\, v - \tfrac{1}{2} d\, C_x S_f v^3 \qquad (11)$$

Therefore, the power at the wheels and the power losses at the powertrain, are respectively given by the two equations (8) and (11), summarized in the following table:

$P_w = m\, v\, [dv/dt(acc)] + \eta\, mg\, v + \tfrac{1}{2}\, d\, C_x\, S_f\, v^3$ (acceleration phase)
$P_l = m\, v\, [dv/dt(dec)] - \eta\, mg\, v - \tfrac{1}{2}\, d\, C_x\, S_f\, v^3$ (deceleration phase)

The present invention is particularly suitable for automobiles that do not incorporate or allow the full deactivation of RGB; such automobiles may therefore be ICE, hybrid (HEVs), or all-electric/battery (BEVs) ones, but in all such cases the powertrain, as defined above, is able to eliminate RGB losses, and encounter only pumping and drivetrain ones. It is noted at this point, that RGB losses are recovered to a large extent by the traction battery, therefore, if that latter was included in the definition of «powertrain», the «powertrain» would not encounter significant net RGB losses in any case. Reverting to the issue of pumping losses, i.e. power taken from the crankshaft, necessary to drive the engine, i.e. necessary for the engine to perform the intake and exhaust pumping operations during the deceleration phase, we can formulate, based on equation (11), an equation giving only drivetrain losses, $P_d$ as follows:

$$P_d = (1-K)[m \ v[dv/dt(dec)] - \eta mg \ v - \frac{1}{2}d \ C_x S_f v^3] \quad (12)$$

wherein K is an empirical dimensionless factor, between 0 and 1, representing pumping losses as a fraction of total powertrain, i.e. the sum of pumping and drivetrain, losses.

The automobile horsepower, $P_e$ is, by definition, equal to the sum of wheel horsepower, $P_w$ and drivetrain losses, $P_d$:

$$P_e = P_w + P_d \quad (13)$$

Therefore, substituting in (13) for the values of $P_w$ and $P_d$ given by (8) and (12) respectively, for each value of the velocity, v we finally get equation (1):

$$P_e = m \ v[dv/dt(acc) + (1-K)dv/dt(dec)] + K[\eta mg \ v + \frac{1}{2}d \ C_x S_f v^3] \quad (1)$$

The above holds true under the additional assumption that the drivetrain power losses during deceleration adequately represent the drivetrain power losses during acceleration, for each engine speed (in rpms) with the selected, for the measurement, gear. This assumption is, for all practical purposes, very close to reality, although in principle the drivetrain losses during acceleration are slightly higher than the respective losses during deceleration.

Equation (1) reduces to the following simplified equation (14), for values of K approaching zero, i.e. when pumping losses are approaching zero:

$$P_e = m \ v[dv/dt(acc) + dv/dt(dec)] \quad (14)$$

K depends on various factors, as discussed in detail in the following paragraph.

Pumping losses are reduced when: a) the engine is a diesel one, whereby the throttle is always fully open and therefore the inlet manifold vacuum is approaching zero, b) engine operates with only some of its cylinders, i.e., having deactivated the others, at complete release of the throttle pedal, something that is a necessary condition for performing the deceleration phase incorporated in the present method, a technology that is employed by an increasing number of automobile manufacturers, whereas at least one of them, specifically a mass production manufacturer, has already adopted the deactivation of all cylinders during complete throttle lift-off eliminating thus pumping losses, c) engine displacement becomes smaller, something that is the current automotive industry trend, commonly referred to as «downsizing», and d) the automobile engine is equipped with an Exhaust Gas Recirculation, EGR valve, which allows, at full release of the throttle pedal, the intake of exhaust gases in the inlet manifold after the throttle, therefore reducing inlet manifold and in-cylinder vacuum; this technology was launched since the early 70's and is standard to all new automobiles since many years ago.

Based on the above, equation (14) is accurate for measuring the engine horsepower of many classes of modern automobiles, mainly the ones powered by a diesel engine and the ones deactivating all cylinders at complete throttle lift-off. It is also accurate, maybe to a lesser extent, for measuring automobiles equipped with a small and medium-sized gasoline engine, incorporating also the technology of deactivating some of the cylinders at complete throttle lift-off.

Moreover, the fact that this invention method measures the forces exerted on an automobile regardless of the source of the driving force, expands its scope to HEVs and BEVs, widely estimated to constitute the majority of new automobile sales by the mid-2020's. In these cases, it is repeated that the measurement procedure described applies to HEVs and BEVs having an operating mode that allows the electric vehicle to decelerate at complete throttle lift-off without any RGB and respective power losses. The horsepower figures measured may hence be a) the horsepower at the wheels, always through equation (8), and b) in the case of HEVs with a gasoline engine, the horsepower delivered by the combined gasoline engine and electric motor(s), through equation (1), or, in the case of HEVs with a diesel engine and BEVs, where pumping losses are minimal and non-existent, respectively, the horsepower delivered by the combined diesel engine/electric motor(s) and the electric motor(s), respectively, through equation (14). These would be interesting measurements when performed, for instance, at different battery charge levels; also, «tuning» of HEVs and BEVs is an already existing after-market activity, whereby the OEM controller is being substituted by a custom one.

On the other hand, general equation (1) is also valid for larger gasoline engines and older automobiles, for values of the factor K depending on the automobile to be measured.

Especially for normally aspirated four-stroke gasoline engines, powering a large percentage of the total number of automobiles in use worldwide, SAE has provided a guideline, according to SAE J1349 (August 2004). According to such guideline, if friction data are not available, as is the case for this invention method which is intended to be easily applicable, a mechanical efficiency of 85% has to be assumed. Taking such assumption as valid in the case of road tests also, it translates into the following simple relationship:

$$P_e = 85/15 P_p, \text{equiv. to } P_p = 15/85 P_e \quad (15)$$

wherein $P_p$ are the pumping power losses.

Equation (14), which holds true in the case where RGB losses are non-existent and pumping losses are negligible or non-existent, can be easily generalized to include such pumping losses as follows:

$$P_e = m \ v[dv/dt(acc) + dv/dt(dec)] - P_p \quad (16)$$

Substituting in (16) for the $P_p$ equivalent as given by (15) and solving for $P_e$, we get the following simplified equation:

$$P_e = 0.85 m \ v[dv/dt(acc) + dv/dt(dec)] \quad (17)$$

which, as already mentioned, holds true for a large percentage of the total number of automobiles in use worldwide, therefore greatly enhancing the scope of the present invention.

It is noted at this point that, alternatively, equation (16) can be readily derived by directly adding equations (8) and (11) of par. [0048] for each value of v, cancelling out opposite terms and setting $P_l = P_d + P_p$ (it is repeated that no RGB losses are assumed for the purposes of this invention):

$$P_w + P_d + P_p = P_e + P_p = m \ v[dv/dt(acc) + dv/dt(dec)] \quad (18)$$

It is hereby again assumed that power figures measured during a test in real road conditions adequately approximate respective FIGURES during a «bench test» of horsepower.

Therefore, equation (18) gives, in the case of an ICE, its indicated power, $P_i$, which is by definition equal to the sum of horsepower at the crankshaft, $P_e$ and pumping losses, $P_p$:

$$P_i = m \ v[dv/dt(acc) + dv/dt(dec)] \quad (19)$$

therefore, this invention method also approximates, per equation (19), the indicated power of an ICE.

Summarizing, by measuring velocity and acceleration utilizing an accelerometer and knowing or making an educated guess of the abovementioned parameters, the present invention method can calculate using equation (8) the wheel horsepower and using equations (1) or (14) or (17) the automobile horsepower, much more accurately than heretofore methods. Unlike already existing methods and applications in real road conditions claiming to measure automobile horsepower, the present invention method incorporates a deceleration phase which allows the calculation of drivetrain losses per equation (12). Existing methods do not incorporate a deceleration phase and cannot calculate such drivetrain losses. Existing applications measure wheel horsepower and then simply estimate automobile horsepower by making assumptions for the magnitude of the drivetrain power losses.

FIG. 1 is a flowchart of a method for measuring the automobile and/or wheel horsepower, according to an embodiment of the present invention. The method includes immediately after start (Step 10), selecting measuring either both the automobile and the wheel horsepower, or only the automobile horsepower (Step 20). It is noted that the wheel horsepower may be calculated using equation (8) discussed above in detail. In addition, if the user wishes to measure only the automobile horsepower, and equations (14) or (17) are the appropriate ones, per Step 30, then only the values of m and the velocity achieved per 1,000 rpms for the gear to be selected (Step 50 instead of Step 40) may be entered into the program. The program may be a mobile device application, e.g., a smartphone application. In the specific case where the user does not wish to create a map of automobile horsepower Vs engine speed, then he/she needs to enter only the value of m as explained above and also in the below example of implementation of the invention.

Then the measuring device, such as a smartphone, is steadily mounted in the automobile to be measured (Step 60), a gear is selected and the automobile is accelerated at full throttle throughout the rev range (Step 70) and, immediately after, the throttle/gas pedal is fully released and the automobile is left to decelerate down the rev range with the gear selected during the acceleration phase (Step 80).

Finally, the program calculates the wheel horsepower, if required per Step 20 (Step 90), the automobile horsepower using the appropriate equation per Step 30 (Step 110), and corrects the above calculated horsepower figures according to SAE 31349, per standard practice (Step 120). In order to perform these calculations, the program receives inputs of the necessary weather parameters by a weather conditions mobile application (Box 100).

Example of Implementation of the Invention

According to an implementation of the present invention method, equations (1), (8), (14) and (17) can be readily applied by a device incorporating a software program that utilizes the velocity (v), acceleration (dv/dt(acc)) and deceleration (dv/dt(dec)) measurements as a function of time (t), obtained by an accelerometer also embodied in the device. For example, the device may be a mobile phone such as a smartphone that has an accelerometer and a suitable mobile application.

The method may be implemented by the following steps: Initially, the user will be prompted to enter into the program via a virtual keypad the parameters m, K, η, d, $C_x$, $S_f$ and the velocity achieved by the automobile per 1,000 rpms for the gear to be selected, the latter parameter needed only if the mapping of horsepower figures Vs engine speed is required by the user;

Then, the measuring device such as a smartphone may be steadily mounted in the automobile to be measured;

Following the above, a gear may be selected and the automobile may be accelerated at full throttle throughout the rev range. Using the first gear is not recommended due to wheel spin reducing acceleration and velocity, especially in the case of more powerful automobiles, unless this is the only gear of the gearbox, as is the case for most current BEVs;

Immediately after the above described acceleration phase, the throttle/gas pedal may be fully released and the automobile may be left to decelerate down the rev range with the selected gear engaged during the acceleration phase;

During the run, the program calculates through equations (8) and, (1) or (14) or (17) depending on the specific case as discussed, and maps the wheel horsepower Vs time and/or Vs velocity and/or Vs engine speed and the automobile horsepower Vs time and/or Vs velocity and/or Vs engine speed, respectively. Maximum wheel and automobile horsepower figures can be identified from the above two sets of graphs. It is noted that the conversion of a horsepower Vs velocity graph to a horsepower Vs engine speed graph, may be readily performed, as the velocity (in km/h, or miles/h, or m/s) per 1,000 rpms achieved by the gear employed may be optionally entered by the user into the program, as given by the automobile manufacturer and the relevant automotive literature.

It is evident that, if the user of the device is interested to measure only the automobile horsepower and equations (14) or (17) are the appropriate ones, as discussed above, he/she needs to enter into the program only the parameters: a) m, and b) the velocity achieved by the automobile per 1,000 rpms for the gear to be selected, the latter parameter again needed only if the mapping of automobile horsepower Vs engine speed is required by the user.

In addition, if the measuring device has a real-time connection with weather mobile applications, something very common, for example for a smartphone, then the user does not need to enter the value of d, as the program may calculate it based on a simple embedded algorithm utilizing the values of necessary ambient weather parameters (see below).

Finally, the program may correct according to SAE J1349 (August 2004 revision) the calculated wheel and/or automobile horsepower figures and display the maximum corrected respective figures. This correction is valid if the automobile is powered by an ICE; in the cases of HEVs or BEVs it is not valid, for reasons evident to those skilled in the art.

The following has to be noted for the case of BEVs powered by more than one electric motor, e.g. by a front and a rear motor: such motors may rotate at different speeds at each point in time, therefore the mapping of horsepower Vs engine speed may be performed for each electric motor separately, according to an embodiment. Accordingly, in this case it is necessary to input the velocity achieved by the automobile per 1,000 rpms of each electric motor, for the gear to be selected. The program will therefore map the combined horsepower of the electric motors Vs the engine speed of each electric motor. It is anticipated that, in the near future, such automobiles will capture a significant market share of new automobile sales.

Numerical Examples of the Implementation of the Invention on Two Test Automobiles 1) We measure the horsepower figures of a manual gearbox, 4-wheel-drive performance automobile with a small, 4-cylinder turbocharged four-stroke gasoline engine of a 1,984 cc displacement, not incorporating the technology of cylinder deactivation, a mass of 1,600 kgs (incl. driver etc), a $C_x$ of 0.33 and an $S_f$ of 2.13 m$^2$, with which a test run is made up to a measured velocity of 110.0 km/h, or 68.4 miles/h, or 30.56 m/s. Such a velocity is achieved with 3rd gear at the engine speed of maximum horsepower, specifically 6,000 rpm. The car's acceleration at full throttle and at the above velocity with the gear engaged, is measured at 3.43 m/s$^2$. The air density at the run's ambient conditions (i.e., temperature of 20° C., pressure of 1,010 hPa and relative humidity of 30%, i.e. dry air pressure of 1,003 hPa) is 1.20 kg/m$^3$. Finally, we assume that the rolling friction coefficient is 0.013. Applying equation (8) inputting the aforementioned parameters the device calculates the maximum wheel horsepower, $P_{w,max}$ as follows:
$P_{w,max}$=1,600×30.56×3.43+0.013×1,600×9.81×30.56+½× 1.20×0.33×2.13×30.56$^3$=185,986 watts=252.9 ps=249.4 bhp, at the test conditions, i.e. uncorrected.

The device may then calculate the maximum automobile horsepower (which is the horsepower at the crankshaft in this case), $P_{e,max}$ applying equation (14) and additionally assuming, only for simplification and illustrative purposes, that it appears at the same engine speed of 6,000 rpm and, accordingly, at the same automobile velocity, i.e., at 110 km/h or 68.4 miles/h, as the maximum wheel horsepower, $P_{w,max}$.

The automobile's deceleration at the abovementioned automobile velocity is measured at 1.12 m/s$^2$. We therefore get:
$P_{e,max}$=1.600×30,56×[3,43+1,12]=222.477 watts=302.5 ps=298.3 bhp (at 6,000 rpms), of which 48.9 bhp are the power losses at the drivetrain.

Correcting the above FIGURE according to SAE J1349 (August 2004 revision), i.e. at the temperature of 25° C. and dry air pressure of 990 hPa, we get a maximum corrected horsepower at the crankshaft figure of $P_{e,max,corr}$=290.8 bhp.

For comparison purposes, the in-house, chassis dynamometer of DynoDynamics in Athens, Greece measured a corrected maximum horsepower at the crankshaft of 295.6 bhp at 6,200 rpm with 3rd gear. This invention method therefore rendered a more conservative, by 1.6% estimate, taking the dynamometer measurement as a reference, something that is of course not valid as discussed earlier in this document. It is nevertheless observed that the maximum crankshaft horsepower figure of the dynamometer appears at a slightly higher engine speed, something generally favoring the appearance of an also slightly higher horsepower figure.

2) We measure the horsepower figures of a semi-automatic, dual clutch gearbox, rear-wheel-drive performance automobile with a larger, V8 naturally aspirated four-stroke gasoline engine of a 4,244 cc displacement, not incorporating the technology of cylinder deactivation, a mass of 1,750 kgs (incl. driver etc), a $C_x$ of 0.33 and an $S_f$ of 2.00 m$^2$, with which a test run is made up to a measured velocity of 180.6 km/h, or 112.2 miles/h, or 50.17 m/s. Such a velocity is achieved with 4th gear at the engine speed of maximum horsepower, specifically 7,000 rpm. The car's acceleration at full throttle and at the above velocity with the gear engaged, is measured at 2.22 m/s$^2$. The air density at the run's ambient conditions (i.e., temperature of 31° C., pressure of 1,012 hPa and relative humidity of 40%, i.e. dry air pressure of 994 hPa) is 1.16 kg/m$^3$. Finally, we again assume that the rolling friction coefficient is 0.013. Applying equation (8) inputting the aforementioned parameters the device calculates the maximum wheel horsepower, $P_{w,max}$ as follows:
$P_{w,max}$=1,750×50.17×2.22+0.013×1,750×9.81×50.17+½× 1.16×0.33×2.00×50.17$^3$=254,447 watts=346.0 ps=341.2 bhp, at the test conditions, i.e., uncorrected.

The device may then calculate the maximum automobile horsepower (again, the horsepower at the crankshaft), $P_{e,max}$ applying equation (17), as, in this case, the large engine displacement renders necessary the consideration of pumping losses and the characteristics of the engine render this equation applicable. We are additionally assuming, only for simplification and illustrative purposes, that $P_{e,max}$ appears at the same engine speed of 7,000 rpm and, accordingly, at the same automobile velocity, i.e. at 180.6 km/h or 112.2 miles/h, as the maximum wheel horsepower, $P_{w,max}$.

The automobile's deceleration at the abovementioned automobile velocity is measured at 1.74 m/s$^2$. We therefore get:
$P_e$,max=0.85×1.750×50,17×[2.22+1.74]=295,526 watts=401.8 ps=396.3 bhp (at 7,000 rpms), of which 55.1 bhp are the power losses at the drivetrain.

Correcting the above FIGURE according to SAE J1349 (August 2004 revision), i.e. at the temperature of 25° C. and dry air pressure of 990 hPa, we get a maximum corrected horsepower at the crankshaft figure of $P_{e,max,corr}$=399.1 bhp.

It has to be noted that the above automobile is a base model developing, per factory claim, 395 bhp at 7,000 rpm, which however runs with a commercial lubricant additive in turn claiming to increase engine horsepower. It is seen that the measurement by the present invention method indeed rendered a FIGURE slightly increased as compared to factory's claim.

The above two examples are derived from respective approximate measurements and calculations using an accelerometer on the patent applicant's tuned Audi S3 and base Maserari Gransport, both 2007 model year.

Although the invention has been described with specific embodiments it should be understood that many other embodiments may be envisaged by those skilled in the art to which the present invention pertains without departing from the scope or spirit of the present invention as defined by the following claims.

What is claimed is:

1. A method for measuring automobile horsepower, the method comprising:
   steadily mounting into the automobile a mobile device including an accelerometer and a mobile device application operatively coupled to each other,
   performing an acceleration phase by accelerating the automobile in real road conditions on a flat and horizontal road with a selected gear and measuring using the accelerometer acceleration and velocity of the automobile during the acceleration phase,
   immediately after the acceleration phase of the automobile, performing a deceleration phase by decelerating the automobile in real road conditions with the same selected gear as the one used during the acceleration phase of the automobile and measuring using the accelerometer deceleration and velocity of the automobile during the deceleration phase of the automobile, and calculating automobile horsepower $P_e$ using the mobile device application and measured acceleration, deceleration and velocity during the acceleration and deceleration phases according to the following equation:

$$P_e = m\ v\ [dv/dt(acc)+(1-K)\ dv/dt(dec)]+K\ [\eta mg\ v +\tfrac{1}{2}d\ C_x\ S_f\ v^3]$$

wherein: m is the total mass of the automobile including passengers and cargo, v is the measured automobile velocity, dv/dt(acc) is the measured automobile acceleration, dv/dt(dec) is the measured automobile deceleration, t is time, K is a dimensionless empirical factor between 0 and 1 representing pumping losses at full release of the accelerator pedal as a fraction of powertrain losses, $\eta$ is the rolling friction coefficient, g is the gravitational constant, d is the density of air at the ambient conditions where the measurement takes place, $C_x$ is the aerodynamic resistance coefficient of the automobile and $S_f$ is the frontal area of the automobile.

2. The method according to claim 1, wherein for an automobile for which pumping losses are negligible or non-existent at full release of the accelerator pedal, the automobile horsepower is calculated using the following equation:

$$P_e = m\ v\ [dv/dt(acc)+dv/dt(dec)].$$

3. The method according to claim 1, wherein for an automobile powered by a naturally aspirated four-stroke gasoline engine not incorporating the cylinder deactivation technology, the automobile horsepower is calculated using the following equation:

$$P_e = 0.85\ m\ v\ [dv/dt(acc)+dv/dt(dec)].$$

4. The method according to claim 1, for an automobile powered by an internal combustion engine, not incorporating the cylinder deactivation technology, wherein the indicated power, $P_i$ of such engine is calculated using the following equation:

$$P_i = m\ v\ [dv/dt(acc)+dv/dt(dec)].$$

5. The method according to claim 1, further comprising calculating powertrain losses $P_l$ during the deceleration phase, according to the following equation:

$$P_l = m\ v\ [dv/dt(dec)] - \eta mg\ v - \tfrac{1}{2}d\ C_x S_f v^3.$$

6. The method according to claim 1, applied to an automobile that does not incorporate or allows the full deactivation of regenerating braking.

7. The method of claim 1, wherein the parameters m, K, $\eta$, d, $C_x$, $S_f$ and velocity per 1,000 rpms for the gear selected during the acceleration and deceleration phases are entered into the mobile device application via a virtual keypad prior to the performing of the acceleration phase.

8. A method for measuring automobile horsepower in real road conditions, the method comprising:
steadily mounting into the automobile an accelerometer and a mobile device including a mobile device application;
measuring the acceleration and velocity of the automobile using the accelerometer while accelerating the automobile with a selected gear during an acceleration phase of the automobile;
measuring the deceleration and velocity using the accelerometer while decelerating the automobile with the same selected gear as the one used during the acceleration phase during a deceleration phase of the automobile immediately following the acceleration phase of the automobile;
transmitting the measured values of acceleration, deceleration and velocity of the automobile during the acceleration and deceleration phases of the automobile to the mobile device application and calculating the automobile horsepower $P_e$ with the mobile device application using the transmitted measured values.

9. The method of claim 8, wherein the mobile device is a smartphone, and
wherein the calculating of the automobile horsepower employs the following equation:

$$P_e = m\ v\ [dv/dt(acc)+(1-K)dv/dt(dec)]+K\ [\eta mg\ v +\tfrac{1}{2}d\ C_x S_f v^3]$$

wherein: m is the total mass of the automobile including passengers and cargo, v is the measured automobile velocity, dv/dt(acc) is the measured automobile acceleration, dv/dt(dec) is the measured automobile deceleration, t is time, K is a dimensionless empirical factor between 0 and 1 representing pumping losses at full release of the accelerator pedal as a fraction of powertrain losses, $\eta$ is the rolling friction coefficient, g is the gravitational constant, d is the density of air at the ambient conditions where the measurement takes place, $C_x$ is the aerodynamic resistance coefficient of the automobile and $S_f$ is the frontal area of the automobile.

10. The method of claim 9, wherein when the automobile has negligible or non-existent pumping losses at full release of the accelerator pedal the automobile horsepower is calculated using the following equation:

$$P_e = m\ v\ [dv/dt(acc)+dv/dt(dec)].$$

11. A method for measuring horsepower at the rotor shaft of a fully electric automobile, the method comprising:
steadily mounting into the automobile an accelerometer and a mobile device including a mobile device application;
measuring the acceleration and velocity of the automobile using the accelerometer while accelerating the automobile with a selected gear during an acceleration phase of the automobile;
measuring the deceleration and velocity of the automobile using the accelerometer while decelerating the automobile with the same selected gear as the one used during the acceleration phase of the automobile during a deceleration phase of the automobile immediately following the acceleration phase of the automobile;
transmitting the measured values of acceleration, deceleration and velocity of the automobile during the acceleration and deceleration phases of the automobile to the mobile device application and calculating the automobile horsepower $P_e$ with the mobile device application using the transmitted measured values.

* * * * *